US 12,518,088 B2

(12) United States Patent
Sinha et al.

(10) Patent No.: US 12,518,088 B2
(45) Date of Patent: Jan. 6, 2026

(54) ZERO-SHOT TRAINING FOR MULTIMODAL CONTENT CLASSIFIER

(71) Applicant: Microsoft Technology Licensing, LLC, Redmond, WA (US)

(72) Inventors: Suhit Sinha, Bangalore (IN); Sankha Subhra Mullick, West Bengal (IN); Akshat Mathur, Jaipur (IN); Somya Gupta, Bengaluru (IN); Jidnya Samir Shah, Bangalore (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 18/423,799

(22) Filed: Jan. 26, 2024

(65) Prior Publication Data

US 2025/0217586 A1 Jul. 3, 2025

(51) Int. Cl.
*G06F 40/20* (2020.01)

(52) U.S. Cl.
CPC .................... *G06F 40/20* (2020.01)

(58) Field of Classification Search
CPC ........ G06F 40/279; G06F 40/30; G06F 40/20; G16H 70/40; G06N 20/00
See application file for complete search history.

(56) References Cited

U.S. PATENT DOCUMENTS

| | | | | |
|---|---|---|---|---|
| 9,836,455 B2 * | 12/2017 | Martens | ................ | G06F 40/279 |
| 11,182,545 B1 * | 11/2021 | Tsai | ........................ | G06N 20/10 |
| 11,657,222 B1 * | 5/2023 | Anthony | ................ | G06F 40/279 |
| | | | | 706/12 |
| 2018/0365248 A1 * | 12/2018 | Zheng | .................... | G06F 40/216 |
| 2020/0042580 A1 * | 2/2020 | Davis | ....................... | G06F 16/93 |
| 2020/0111023 A1 * | 4/2020 | Pondicherry Murugappan | ........... | |
| | | | | G06N 5/02 |
| 2020/0311205 A1 * | 10/2020 | Büttner | ................. | G06F 40/216 |
| 2021/0201018 A1 * | 7/2021 | Patel | ........................ | G06N 5/04 |
| 2021/0209142 A1 * | 7/2021 | Tagra | ..................... | G06N 3/044 |
| 2023/0004604 A1 * | 1/2023 | Li | .......................... | G06N 5/048 |
| 2023/0069587 A1 * | 3/2023 | Lukyanenko | ........... | G06F 40/35 |
| 2023/0139831 A1 * | 5/2023 | Wang | ................. | G06V 30/1444 |
| | | | | 704/9 |
| 2023/0367818 A1 * | 11/2023 | Han | ....................... | G06N 20/00 |

* cited by examiner

*Primary Examiner* — Mohammad K Islam

(74) *Attorney, Agent, or Firm* — Cantor Colburn LLP; Renee D. Brown

(57) ABSTRACT

Systems and techniques for are described herein. A content passage is received from a corpus of training data comprising labeled training data and unlabeled training data. A query is received from a query hierarchy for a classification domain. The content passage and the query are embedded to form a passage-query pair. A predicted result for the passage-query pair is generated based on a calculated probability of the predicted result being within an answer threshold. A passage-query-result triplet is generated that comprises the passage-query pair and the predicted result according to the query hierarchy for the classification domain. Vectors of the content classification large language model are updated using the passage-query-result triplet.

20 Claims, 14 Drawing Sheets

ZERO-SHOT TRAINING FOR MULTIMODAL CONTENT CLASSIFIER

CLAIM OF PRIORITY

This Application claims the benefit of priority of Indian Provisional Application Ser. No. 202311089945, filed Dec. 29, 2023, which is hereby incorporated by reference in its entirety.

TECHNICAL FIELD

Embodiments described herein generally relate to large language model (LLM) training and, in some embodiments, more specifically to LLM training using hierarchical query-response pairs for content classification.

BACKGROUND

Online user posted content may include a variety of topics. It may be desirable to classify the topics present in the content so that the content can be organized or otherwise managed. The vast amount of user posted content is unable to be classified manually using human labor so machine learning techniques are used for content classification. Conventional content classifiers are binary in nature where a binary model is trained to filter out a certain categories from content. Content classification policies may change (e.g., be added, removed, modified, etc.). It may be desirable to train a content classifier that enables implementation of rapid policy changes.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
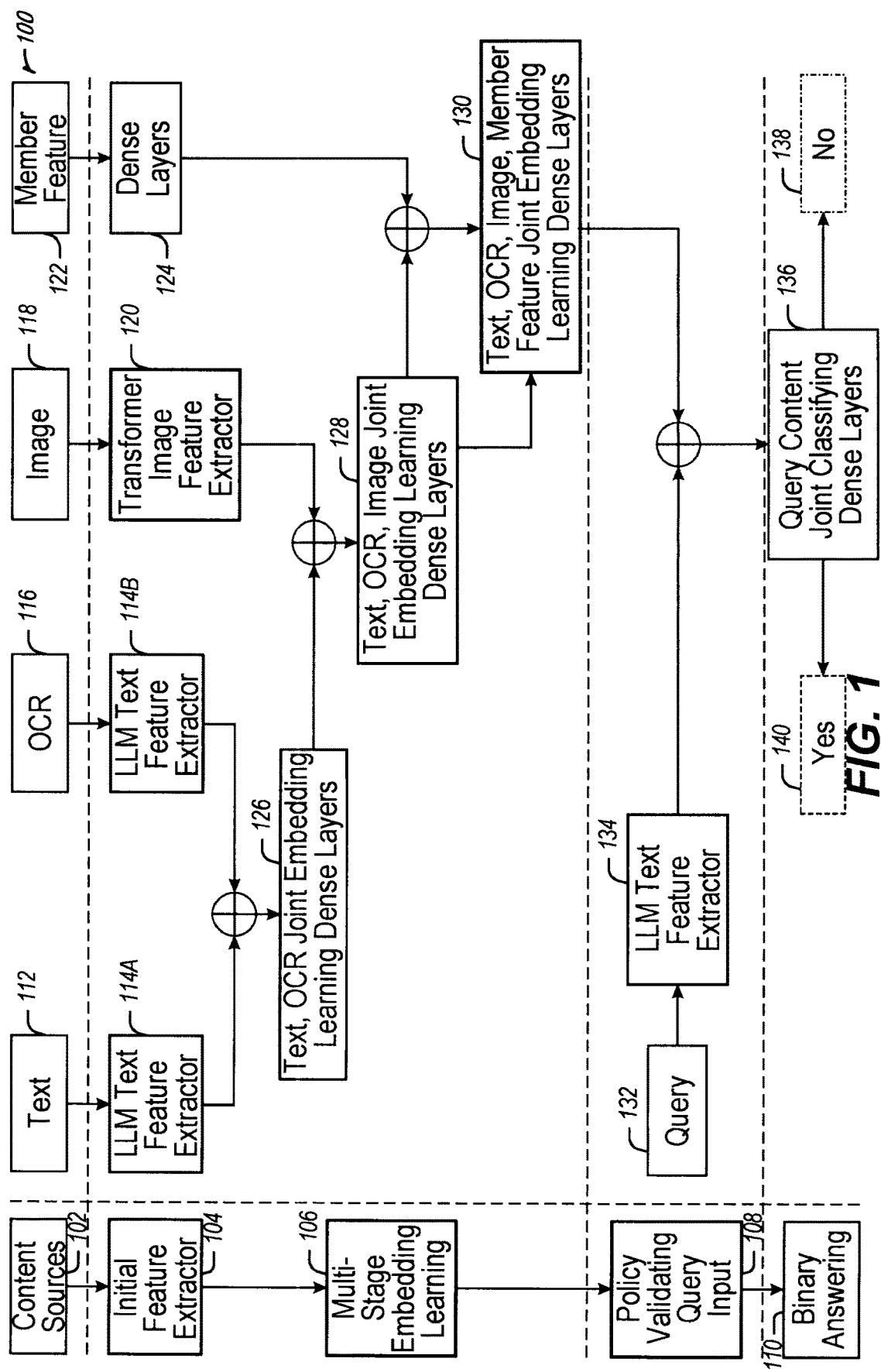
FIG. 1 is a block diagram of an example of a system for, according to an embodiment.

Content classifications may change regularly. Conventional classification policy learning models consider inputs without regard to classification domains resulting in unnecessary processing of inputs that may not be indicative of a particular classification. The architecture of conventional classification learning models necessitates retraining of the entire model when a classification policy is changed (e.g., policy deleted, policy added, policy modified, etc.). The conventional classification model architecture may produce a binary output that does not include granular information that may include an indication of a classification or a sub-classification.

The systems and techniques described herein address the problems of unnecessary processing, whole model retraining, and lack of granularity presented by conventional classification learning models by training individual large language models (LLMs) to answer queries for various classification domains. Providing a corpus of labeled and unlabeled training data as input to domain specific LLMs enables inputs to be filtered at increasing granularity to reduce processor utilization and increases the precision of the LLMs. For example, a model may include a hierarchy of queries regarding whether user data indicates content classified as prohibited items for sale. In the example hierarchy, training inputs may be filtered by applying a query to the LLM with the user data that asks whether the user data includes an item for sale and returns a binary response. If the response is negative, no further processing is conducted (e.g., no further queries asked for the LLM, etc.). If the response is positive, additional queries may be presented to the LLM including whether the user data includes an item for sale from one or more categories. The queries are individually configured providing easy modification of the model by adding, removing, or modifying queries. This eliminates the need to retrain the entire model and allows the domain models to remain effective at the moment of change. The domain model is further refined as additional inputs are processed after any modification is completed.

The systems and techniques discussed herein include a binary query and result based content classification system. A policy structure is leveraged that allows reformulating the problem of content classification as a generic task of binary QnA. The content classification system maintains diversity and limits class imbalance in the training set using a sampling strategy. A scalable multi-level inference strategy enables the content classification system to perform at near computational cost of binary classifiers while offering greater explain ability.

The techniques described herein may be implemented with privacy safeguards to protect user privacy. Furthermore, the techniques described herein may be implemented with user privacy safeguards to prevent unauthorized access to personal data and confidential data. The training of the AI models described herein is executed to benefit all users fairly, without causing or amplifying unfair bias.

According to some embodiments, the techniques for the models described herein do not make inferences or predictions about individuals unless requested to do so through an input. According to some embodiments, the models described herein do not learn from and are not trained on user data without user authorization. In instances where user data is permitted and authorized for use in AI features and tools, it is done in compliance with a user's visibility settings, privacy choices, user agreement and descriptions, and the applicable law. According to the techniques described herein, users may have full control over the visibility of their content and who sees their content, as is controlled via the visibility settings.

According to the techniques described herein, users may have full control over the level of their personal data that is shared and distributed between different AI platforms that provide different functionalities. According to the techniques described herein, users may have full control over the level of access to their personal data that is shared with other parties. According to the techniques described herein, personal data provided by users may be processed to determine prompts when using a generative AI feature at the request of the user, but not to train generative AI models. In some embodiments, users may provide feedback while using the techniques described herein, which may be used to improve or modify the platform and products. In some embodiments, any personal data associated with a user, such as personal information provided by the user to the platform, may be deleted from storage upon user request. In some embodiments, personal information associated with a user may be permanently deleted from storage when a user deletes their account from the platform.

According to the techniques described herein, personal data may be removed from any training dataset that is used to train AI models. The techniques described herein may utilize tools for anonymizing member and customer data. For example, user's personal data may be redacted and minimized in training datasets for training AI models through delexicalization tools and other privacy enhancing tools for safeguarding user data. The techniques described herein may minimize use of any personal data in training AI models, including removing and replacing personal data. According to the techniques described herein, notices may be communicated to users to inform how their data is being used and users are provided controls to opt-out from their data being used for training AI models.

According to some embodiments, tools are used with the techniques described herein to identify and mitigate risks associated with AI in all products and AI systems. In some embodiments, notices may be provided to users when AI tools are being used to provide features.

FIG. 1 is a block diagram of an example of a system 100 for, according to an embodiment. The system 100 may include a variety of components including a content extractor 102 for extracting electronic content (e.g., user posts, etc.), a feature extractor 104, a multi-stage embedding learning engine 106, a policy validating query inputter 108, and a binary answering engine 110.

The content extractor 102 may extract a variety of content types and passes the content to the feature extractor 104. The content may include text 112 from which features are extracted by an LLM text feature extractor 114A of the feature extractor 104. Optical character recognition (OCR) output 116 for text embedded in images may be received by the feature extractor 104 and features are extracted by an LLM text feature extractor 114B. In an example, the LLM text feature extractor 114A and LLM text feature extractor 114B may be the same LLM text feature extractor. In an example, the LLM text feature extractor 114A and the LLM text feature extractor 114B may be separated feature extractors that are individually tuned for a particular feature extraction operation. Images 118 may be received by the feature extractor 104 and features are extracted from the images 118 by a transformer image extractor 120. Member features 122 (e.g., features of the posting member, original posting member, etc.) may be received and extracted by the feature extractor 104 as dense layer 124.

Figure 2:
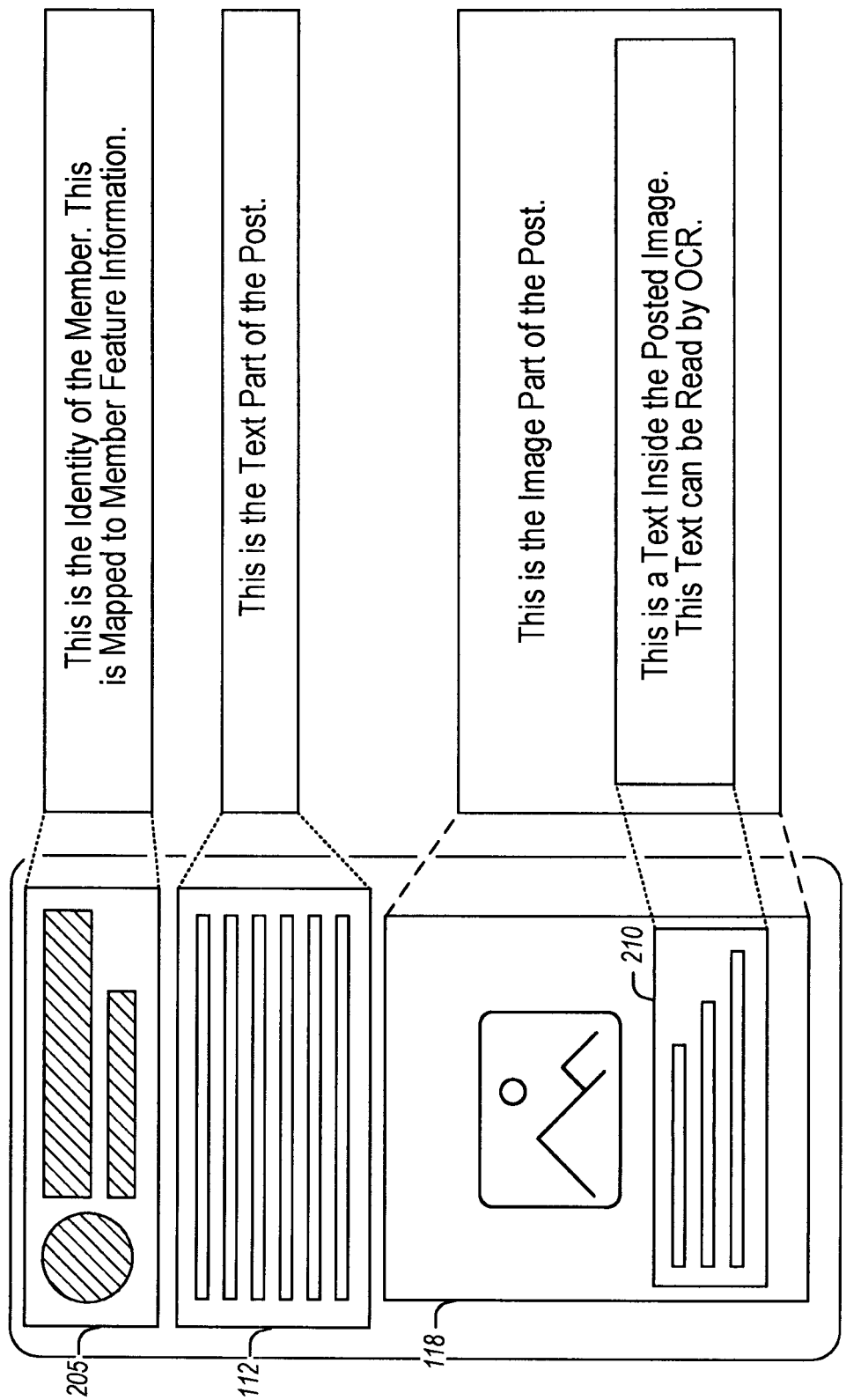
FIG. 2 illustrates and example of content types available in an example user posted content, according to an embodiment.

FIG. 2 illustrates and example of content types available in an example user posted content 200, according to an embodiment. The example user posted content 200 includes member identification information 205 that may be used to retrieve member features 122 as described in FIG. 1, text 112 as described in FIG. 1, an image 118 as described in FIG. 1, and image text 210 that may be the source for the OCR text 116 as described in FIG. 1.

Returning to the description of FIG. 1, the multi-stage embedding learning engine 106 embeds the features extracted by the feature extractor 104. Embedding is performed in stages to accommodate extraction and feature differences of various content types. The multi-stage embedding learning engine 106 embeds the text 112 and OCR 116 feature in text-OCR joint embedded dense layers 126. The image 118 features an the text-OCR joint embedded dense layer 126 are embedded into text-OCR-image joint embedding dense layers 128. The dense layer 124 extracted from the member features 122 are embedded with the text-OCR-image joint embedding dense layers 128 into text-OCR-image-member feature joint embedding dense layers 130. The multi-stage embedding of the multi-stage embedding learning engine 106 results in an output of features for a content item (e.g., user post, etc.).

The policy validating query inputter 108 inputs a query 132 from a policy-based query hierarchy. The policy-based query hierarchy includes a classification query generated from a content classification policy. The classification query may be a weak classification query that may filter a quantity of contents in a content pool from being assigned the classification (e.g., return a negative result, etc.). The policy-based query hierarchy includes one or more sub-classification queries that represent more granular filtering queries. For example, the classification query may determine whether or not the content indicates a product or service for sale and a sub-classification query may determine whether or not the content indicates an illegal drug is for sale. A variety of sub-classification queries may be included in the policy-based query hierarchy. The policy-based query hierarchy may include multiple classification queries for a policy with respective hierarchies included respective sub-classification queries.

A passage-query pair is received comprising a passage from a corpus of training data comprising labeled training data and unlabeled training data, and a query from a query hierarchy for a classification domain. Query features are extracted from the query 132 by an LLM text feature extractor 134. The query features and the text-OCR-image-member feature joint embedding dense layers 130 are received by the binary answering engine 110 and combined into query-content joint classifying dense layers 136 which are used to determine whether to answer the query in the negative 138 or the affirmative 140 for the content. A predicted result is generated for the passage-query pair based on a calculated probability of the predicted result being within an answer threshold. The answer threshold is a probability threshold that is used to indicate a probability value at which a probability of a negative result causes a content to be classified as with a class corresponding to a negative result, a probability value at which a probability of a positive result causes a content to be classified as with a class corresponding to a positive result, a probability ratio between the positive probability and the negative probability, etc. The answer threshold enables conversion of the probability scores to a binary value of 0 (negative) or 1 (positive). The threshold is adjusted higher and lower to vary precision where an increase in the threshold increases precision. A low threshold may be used for weak classifiers for a level 1 query to filter contents to reduce processing while avoiding filtering out content that is to be evaluated with additional classification queries. A passage-query-result triplet is generated comprising the passage-query pair and the predicted result.

The LLM is updated using the training data by developing layers with features that enable result prediction of a yes or no probability for unlabeled content for the issued query. The LLM update includes updating vectors of the large language model using the passage-query-result triplet.

Figure 3:
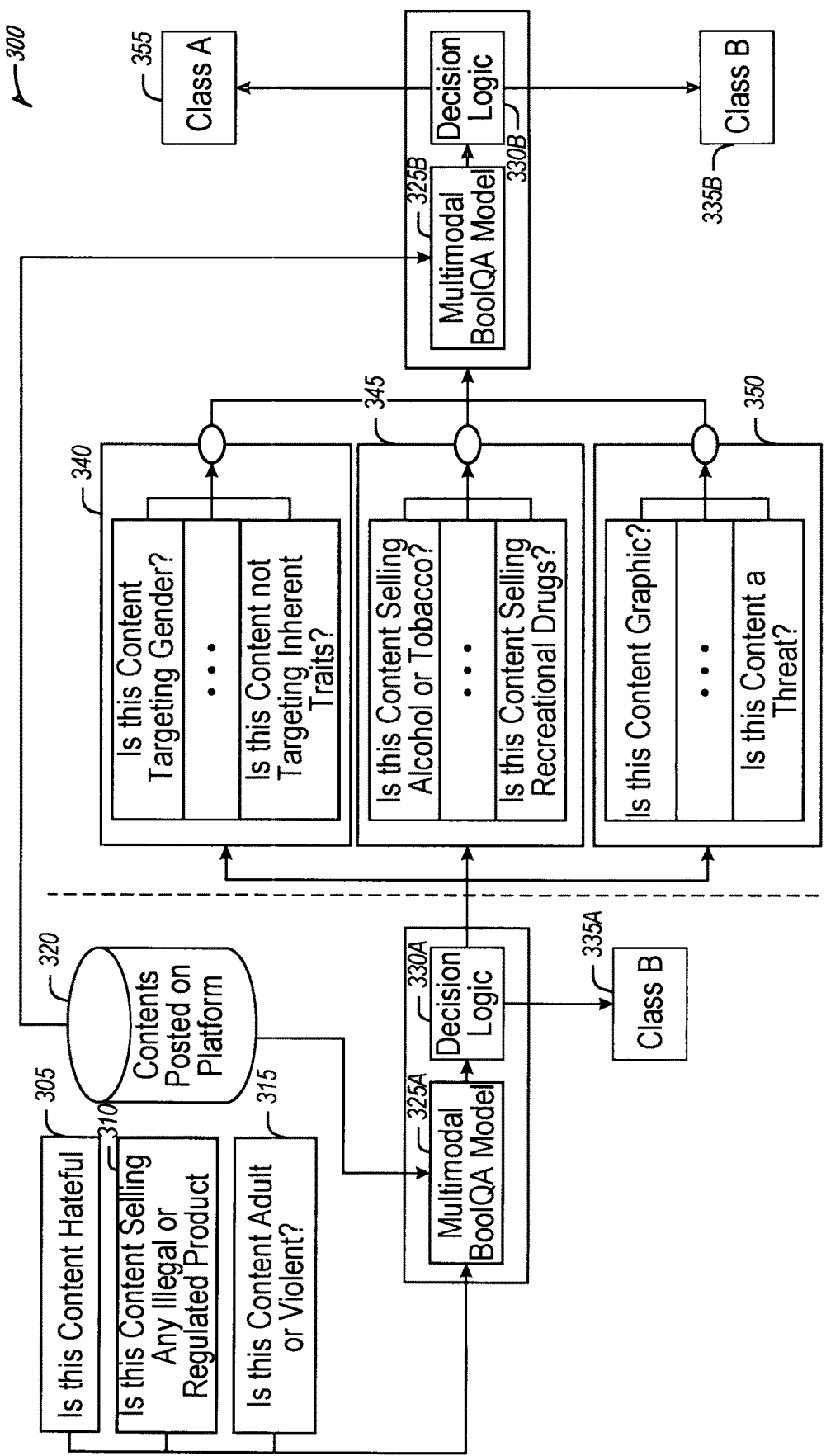
FIG. 3 is a flow diagram of an example of multi-level inference using a large language model trained for content classification, according to an embodiment.

FIG. 3 is a flow diagram of an example of multi-level inference 300 using a large language model trained for content classification, according to an embodiment. A set of policy-based first level classification queries including a first classification query 305, a second classification query 310, and a third classification query 315 are embedded with contents posted on a social network platform (or other platform with user posted data). The embedded query-content data is evaluated using an LLM 325A trained using training data as described in FIG. 2. A result is passed to the decision logic 330A that may include a threshold probability for the result. If the probability of the response is a negative outside the threshold, the content is classified as class B 335A (or is not classified, etc.).

If the result is positive and within the threshold, second level sub-classification queries are issued including a first sub-classification query 340 in a hierarchy with the first classification query 305, a second sub-classification query 345 in a hierarchy with the second classification query 310, and a third sub-classification query 350 in a hierarchy with the third classification query 315. The second-level sub-classification queries are embedded with the content and evaluated using an LLM 325B. The LLM 325B may be the same as LLM 325A or may be an individually trained LLM that has been trained for answering second level sub-classification queries. The results from the LLM 325B are passed to the decision logic 330B that may include a threshold probability for the results to determine a classification for the content. If the probability of the response is a negative outside the threshold, the content is classified as class B 335B (or is not classified, etc.). If the result is positive and within the threshold, the content is classified as class A 355.

Figure 4:
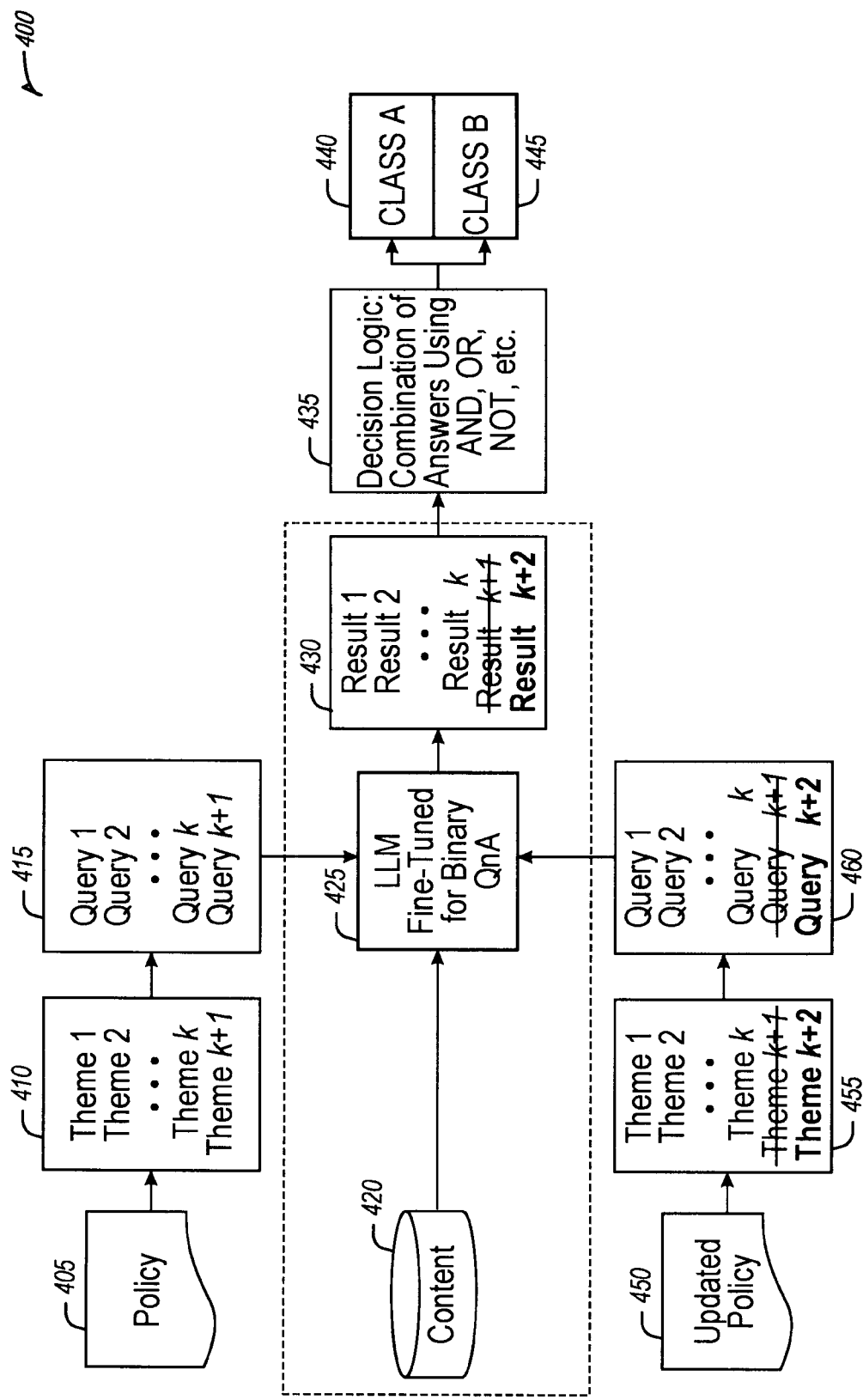
FIG. 4 illustrates an example architecture for, according to an embodiment.

FIG. 4 illustrates an example architecture 400 for, according to an embodiment. A theme 410 validating binary answerable query 415 derived from a policy 405 along with a content 420 is passed to an LLM 425 that returns a result 430 of Yes or No. These results 430 from LLM 425 are then aggregated by the well-defined decision logic 435 provided by the policy 405 to classify the content 420 as Class A 440 or Class B 445. A policy change does not impact the LLM 425 because the LLM 425 uses zero-shot to answer new queries 460. In the event of a policy update 450, Theme k+1 is removed and a new Theme k+2 is introduced in a set of themes 455, the LLM 425 stops answering for Query k+1 and uses zero-shot to answer Query k+2 included in the updated queries 460, and the decision logic 435 is updated.

Zero-shot learning is a technique in machine learning where a model is able to recognize and classify data that it has not been explicitly trained on. The idea is that the model learns a representation of different classes and features during its training, and can then generalize this knowledge to new unseen classes without needing direct examples. The zero-shot technique is used to train the LLM 425 to enable the LLM 425 to classify data that may be new based on the training data that has been previously processed. The LLM 425 is trained on a dataset containing images, text, or other data belonging to known classes (e.g. sales content, illegal substance content, etc.). The LLM 425 learns representations and features that characterize each class. Alongside the training data, the LLM 425 has access to a description or attributes of each class. This allows it to learn a relationship between the feature representations and the class descriptions. When presented with data from a new unseen class at test time (e.g. a new term for an illegal substance, etc.), the LLM 425 can analyze its features and map them to the description of the new class, even though it has not encountered actual text containing the new substant term during training. The zero-shot learning of the LLM 425 recognizes new classes without re-training the LLM 425 by leveraging learned feature representations and class descriptions or attributes from the queries presented to the LLM 425.

Using queries 415, the content classification system leverages explicit policy 405 knowledge and consequently gains agility to policy changes 450 in a zero-shot manner. Policies 405 are parameterized into simpler and granular decisions to form the queries 415 by leveraging a decision tree created by a policy team. A query-result based framework is used to build a model that learns small granular themes 410 of complex policy definitions. The framework is updated to make it multimodal to capture text, optical character recognized (OCR) text embedded inside images, images, etc. that may contribute to content classification. A multi-level inference strategy is used to support two level decision logic for classification policies.

For example, a set $X=\{X_1, X_2, \ldots, X_n\}$ of n text contents paired with a set of labels $Y_P=\{\text{Class A, Class B}\}^n$ where P is the underlying policy. Due to imbalance between s Class A and c Class B contents, n=c+s and c=rs where r>1 is the imbalance ratio. A policy P consists of a set of themes T and a decision logic (combination of logical operators like AND, OR, etc.) D to combine the theme-specific validations to reach a final Class A or Class B label or P=(T, D). Now P when circulated to the user, should phrase T as a guideline to assist the user in creating good quality content. However, when P is provided to human reviewers, T can be rephrased as queries Q as that is more intuitive for validating a content. For example, a publicly circulated classification policy may state "Please do not create hateful contents that target the inherent traits of an individual or group."

Figure 5:
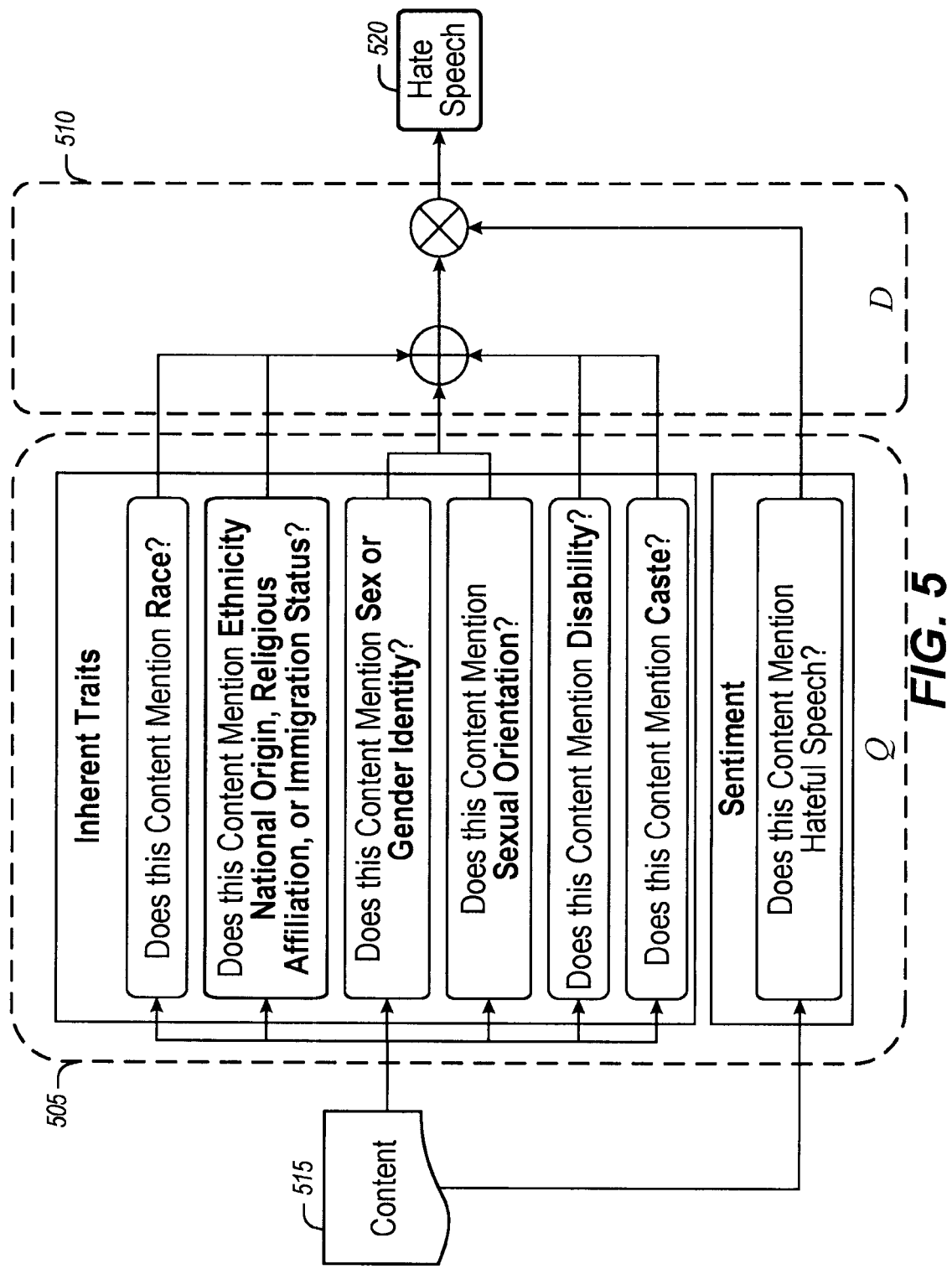
FIG. 5 illustrates an example of queries derived from a classification theme and decision logic for a policy.

FIG. 5 illustrates an example of queries derived from a classification theme and decision logic for a policy. Set of queries Q 505 (derived from a theme T) and decision logic D 510 for an example Hate Speech policy. To a reviewer a classification policy may be rephrased as the set of binary answerable queries Q 505 along with the decision logic D 510 to aggregate the results, as shown in FIG. 5. Similarly, T is rephrased as Q such that the results of Q can be logically combined by D. Formally, for a policy with k themes the set $Q=\{q_1, q_2, \ldots, q_m\}$ contains m validatory queries. Here, $m \geq k$ and equality is achieved when each theme has exactly one validating query. The decision logic D is a Boolean function that maps from $\{0, 1\}^m$ and to $\{0, 1\}$ using logical operators. Yes is represented as 1 and No is represented as 0 to match the implementation while ⊗ and ⊕ respectively denote the logical operators AND and OR. Content 515 is combined with the set of queries Q 505 and the results are processed with the decision logic D 510 to output a hate speech result 520 as a 1 for Yes or 0 for No.

Figure 6:
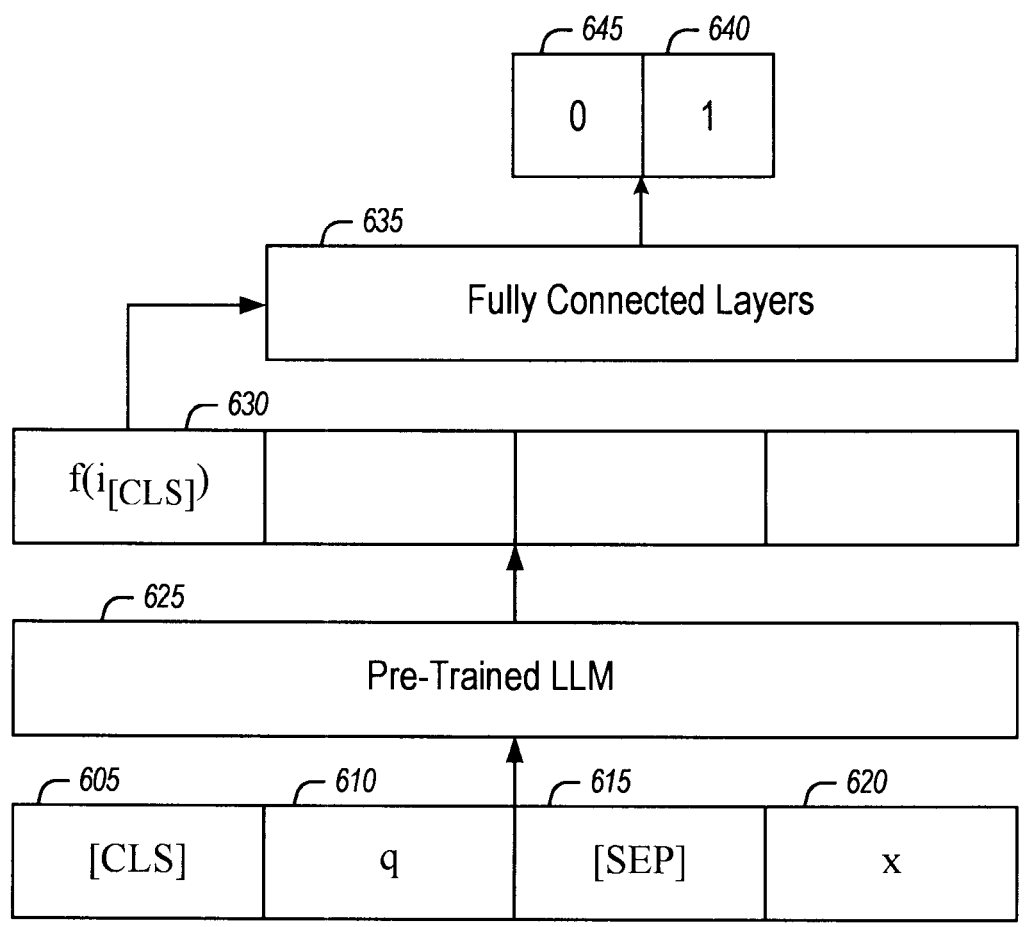
FIG. 6 is an example model architecture for, according to an embodiment.

FIG. 6 is an example model architecture 600 for, according to an embodiment. The systems and techniques discussed herein build on LLM classifiers (Devlin et al., 2018) and BoolQ (Clark et al., 2019) for validating a content x∈X against a query q∈Q. The input i concatenates [CLS] 605, q 610, [SEP] 615, and x 620 in the order, where [CLS] 605 and [SEP] 615 are special tokens. The output f(i) of the LLM f 625 summarizes the input i in the feature space at $fi_{[CLS]}$ 630 as the dimension corresponding to the [CLS] 605 input token (Devlin et al., 2018). This $fi_{[CLS]}$ 630 is sent through fully connected layers 635 to map to the two classes (Clark et al., 2019) Class A 640 and Class B 645. After applying softmax to the logits, the model outputs probability scores Pr(1|(q, x)) and Pr(0|(q, x)) respectively for 1 (Yes) 640 and 0 (No) 645 responses. A threshold θ converts the probability scores to binary labels. This can be trained end-to-end with a loss such as binary cross-entropy.

The content classification system model architecture takes a query and content pair as input while using the output corresponding to the [CLS] token 605 to map to a result (e.g., Class A 640 or Class B 645). Model input is in a format <passage, query> where the 'passage' is feed post commentary. Thus to create a model input dataset, feed post data is paired with the queries. Output is formatted as passage-query-result triplets. Given the triplets, one data category is missing to train the model. Passages may be missing that are not classified as Class A 640 but include positive results for sub-classification queries. Without these passages, sub-classification queries (e.g., "does this content mention a race?") will get overfit on Class A 640 data (e.g., based on a limited number of examples in the training data, etc.) and will miss out on understanding generic concepts of sub-classifications (e.g., race, religion, etc.).

To mitigate the issue, samples are included which are clear but mention sub-classification themes (e.g., religion, race, gender etc.). A zero-shot text classification model (e.g., Bidirectional and Auto-Regressive Transformers Natural Language Inference (BART-NLI), etc.) is used to identify texts which mention one of these themes. The zero-shot model is a typical entailment based zero-shot model. Given a passage, the model calculates a probability that "this text is about {candidate label}" entails the passage, where candidate label is the theme/concept of the classification.

A training set for each sample is a query-content pair with 1 (Yes) or 0 (No) label. To form the training data the same set of queries Q is asked to every content x in X. However, this may result in class imbalance depending on r and m. For simplicity without loss of generality, if k=m, a content is classified with one classification, and a positive classification corresponds to a Yes result. Thus, there are a total of sm(r+1) queries in the training data, where s of them return a Yes result and the rest (s(m−1) from Class A and rsm from Class B) are return a No result, resulting in an imbalance of (m+mr−1). A naive solution of sampling random No answering query-content pairs may not provide a quality training set.

A diverse query-content pairs with label 0 (No) are sampled in three ways: (S1) Pair a Class A sample with a random query with probability $v_n$ and assign it a 0 (No) label. (S2) Take a Class A x that results Yes to $q_j$. Pair x with probability $v_s$ with any $q \in Q \setminus \{q_j\}$ and label it as 0 (No). (S3) Use theme-specific weak classifiers using models like a text convolutional neural network (e.g., TextCNN) or pre-trained natural language inference models like Bidirectional and Auto-Regressive Transformers (BART) (Lewis et al., 2019) to find the $q_j$ with highest confidence (above ω) that matches with a Class B sample x. With a probability $v_h$, pair x with $q_j$ and label it as 0 (No).

A common intent of a policy is expressed through the top-level classification labels (e.g., Class A, Class B, etc.). To utilize this additional information and learn commonalities across themes to aid zero-shot generalization, Class A and Class B contents are sampled respectively with probability $v_+$ and $v_-$ and pair them with a common intent validating query in the training set. In the process of building the training set, five new data dependent hyperparameters are introduced, namely $v_s$, $v_h$, $v_n$, $v_+$, $v_-$, and ω.

Figure 7:
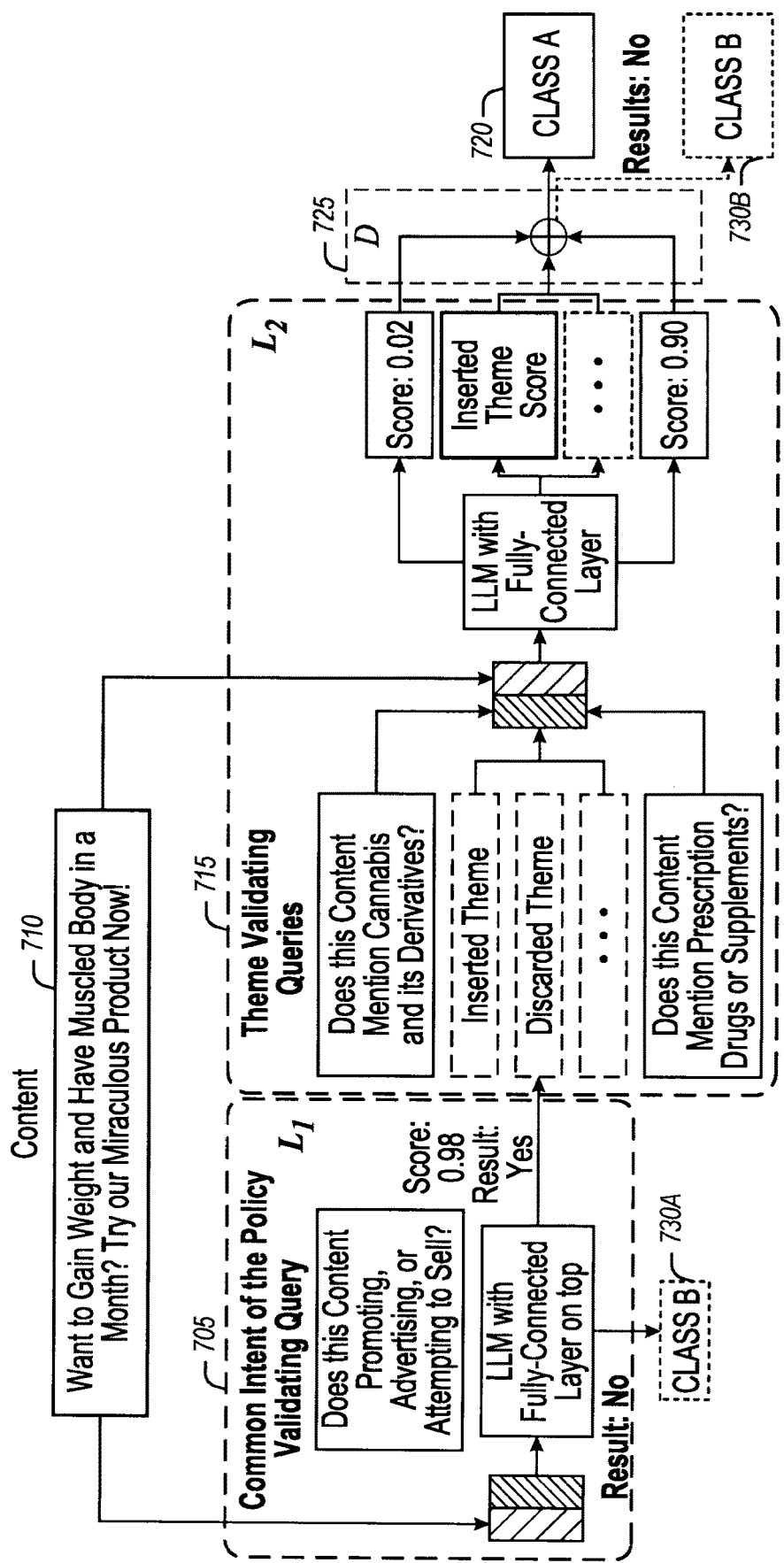
FIG. 7 illustrates a block diagram of an example scalable multi-level inference architecture for, according to an embodiment.

FIG. 7 illustrates a block diagram of an example scalable multi-level inference architecture 700 for, according to an embodiment. The multi-level inference of the content classification system is illustrated with a policy example. The thresholds for both levels are set at 0.5. In $L_1$ 705 (e.g., first level classification query), content 710 receives a high score of 0.98 for a common policy intent to move forward to $L_2$ 715 (e.g., second level classification queries). A hierarchical query structure is utilized and multiple sub-classification levels (e.g., $L_3$, $L_4$, etc.) beyond $L_2$ 715 may be used in classification of the content 710. Each level provides additional granularity to finetune classification of the content 710.

During $L_2$ 715 the content 710 is paired with each of the m theme validating queries and receives scores. Given that the content 710 matches a pharmaceuticals theme sub-classification, it receives a high score of 0.9 for the same and obtains low scores for other theme sub-classification queries. Thus, the content 710 receives a Yes classification for the pharmaceuticals sub-classification and consequently is labeled as Class A 720 by the decision engine 725.

Two peculiarities of the content classification ecosystem are leveraged during inference. (1) Class A 720 content is less frequent than Class B 730B content. (2) Each policy has a common intent across themes that is matched before considering theme violations in a two-level inference strategy. In the first level $L_1$ 705, the content 710 is matched against a single query representing the common intent of a policy. If the content 710 is matched in $L_1$ 705, the second level of $L_2$ 715 is initiated to validate it against m theme-specific queries, otherwise the content 710 is directly marked as Class B 730A. This way only the potential Class A 720 content is validated against m theme-validating queries while the rest will be cleared in $L_1$ 705 with a similar computation cost of a binary classifier. The computational overhead is zm/(1+r) times in practice where z is the ratio of potential Class A 720 content to actual Class A 720 content. In production r≫z (tuning distinct θs for $L_1$ 705 and $L_2$ 715 offers finer control over z) and m is not large thus zm/(1+r) remains close to 1 resulting in scalability similar to conventional classification techniques.

Figure 8:
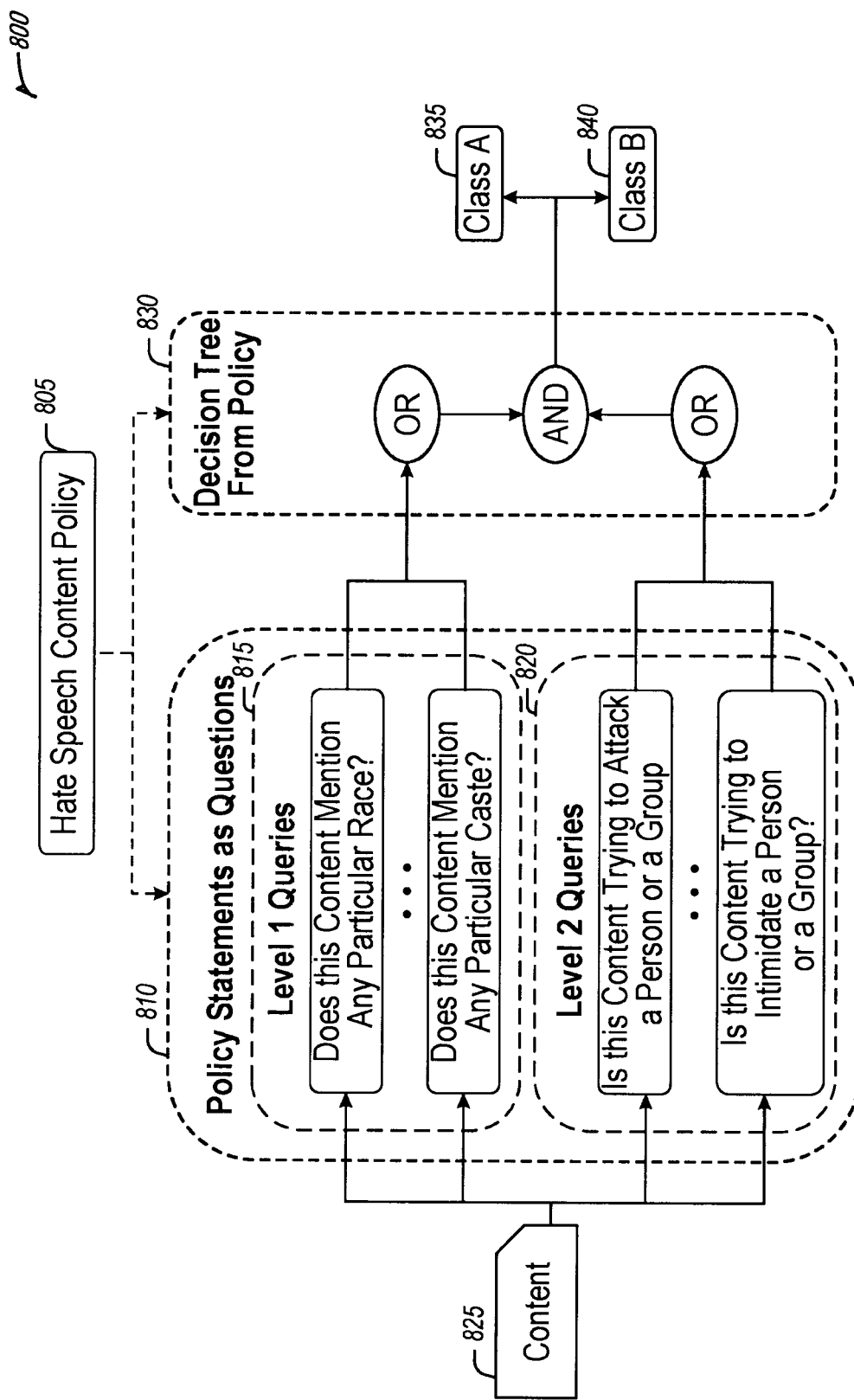
FIG. 8 illustrates an example of LLM classification training using a hierarchical query structure for a content policy, according to an embodiment.

FIG. 8 illustrates an example of LLM classification training 800 using a hierarchical query structure for a content policy, according to an embodiment. To improve the agility of content classifiers in case of content policy updates, a framework called Content Classification through Policy Parameterization (C2P2) is leveraged. Specifically, C2P2 rephrases a content classification task as a Boolean Question Answering (BoolQA) problem and effectively employs the world-knowledge of LLMs to improve content classifier development and maintenance.

In an example, for hate speech classification, the BoolQA based framework is used by leveraging the granular themes inside a Hate Speech content policy 805. With the granular theme based data, a Q&A based model is trained which will enables simpler yes/no answers from the model which are combined as per the policy definition to arrive at a complex answer of whether a content is Class A 835 (hate speech) or Class B 840.

C2P2 is designed to be trained on a unimodal text dataset. If only the text feed update data is used, reduction scope for the category may be lost. Image bytes as a signal may play a limited role for this spam category, whereas text embedded inside an image may serve as a useful signal to the classifier. Hence, both text and text embedded inside images is used as input signals to build a multimodal Q&A based model to detect hate speech in feed updates.

Based on the thematic policy definition, queries are created at two levels of the policy enforcement guidelines in the hate speech content policy 805.

Example level 1 queries 815:
1. Does this content mention any particular race?
2. Does this content mention any particular religion?
3. Does this content mention any particular ethnicity?
4. Does this content mention any particular nationality?
5. Does this content mention gender?
6. Does this content mention sexual orientation?
7. Does this content mention caste?
8. Does this content mention immigration status?
9. Does this content mention disability?

Example level 2 queries 820:
1. Is this content trying to attack a person or a group?
   Attacking, dehumanization and Denigrating merged
2. Is this content trying to intimidate a person or a group?
3. Is this content trying to incite hatred?
4. Is this content promoting discrimination against a person or a group?
   Promoting prejudice, discrimination and misgendering (type of discrimination) merged.
5. Does this content promote violence?

The level 1 queries 815 and level 2 queries 820 are based on exploratory data analysis (EDA) performed on the labeled data. In multi-labeler review we have done for the training dataset, the confusion between different labelers is <% 5 for the level 1 queries 815. Whereas for level 2 queries 820, the confusion in the multi-labeler review scheme increases significantly (~9% of the second level labels have confusion whereas for first level labels the confusion among labelers is tense to zero). The most confusing queries are merged together for level 2 categories.

A policy parameterization framework is used as a Boolean question answering based model with a dataset in the form of $(Q_i, D_j, A_{0|1})$ format, where $Q_i$ being the question (e.g., a level 1 query 815, level 2 query 820, etc.) to be asked on data $D_j$ (e.g., content 825) with a no/yes (0/1) answer to the question $Q_i$. In addition to the Boolean Q&A based model, a multimodal classification framework is built with feed update text and image OCR text data. $D_j$ is formed by concatenating feed update text and image OCR text together sequentially.

To get a $(Q_i, D_j, A_{0|1})$ tuple for Hate Speech positive content:
  Yes Answer Data-couple with the corresponding level 1 query 815 with answer as YES and couple with the corresponding level 2 query 820 with answer as YES.
  No Answer Data-couple with any other theme validating query with answer as NO.

To get a $(Q_i, D_j, A_{0|1})$ tuple for Hate Speech negative content:
  Random No Answer Data—couple with random theme validating level 1 query 815 with answer as NO and couple with random theme validating level 2 query 820 with answer as NO.
  Hard No Answer Data—weak classifiers are used to find the most probable theme for the content and couple with most probable theme validating query with answer as NO.

The individual results of the queries are transmitted to a decision tree 830 based on the content policy 805 to derive an ultimate classification for the content 825 as Class A 835 or Class B 840.

Figure 9:
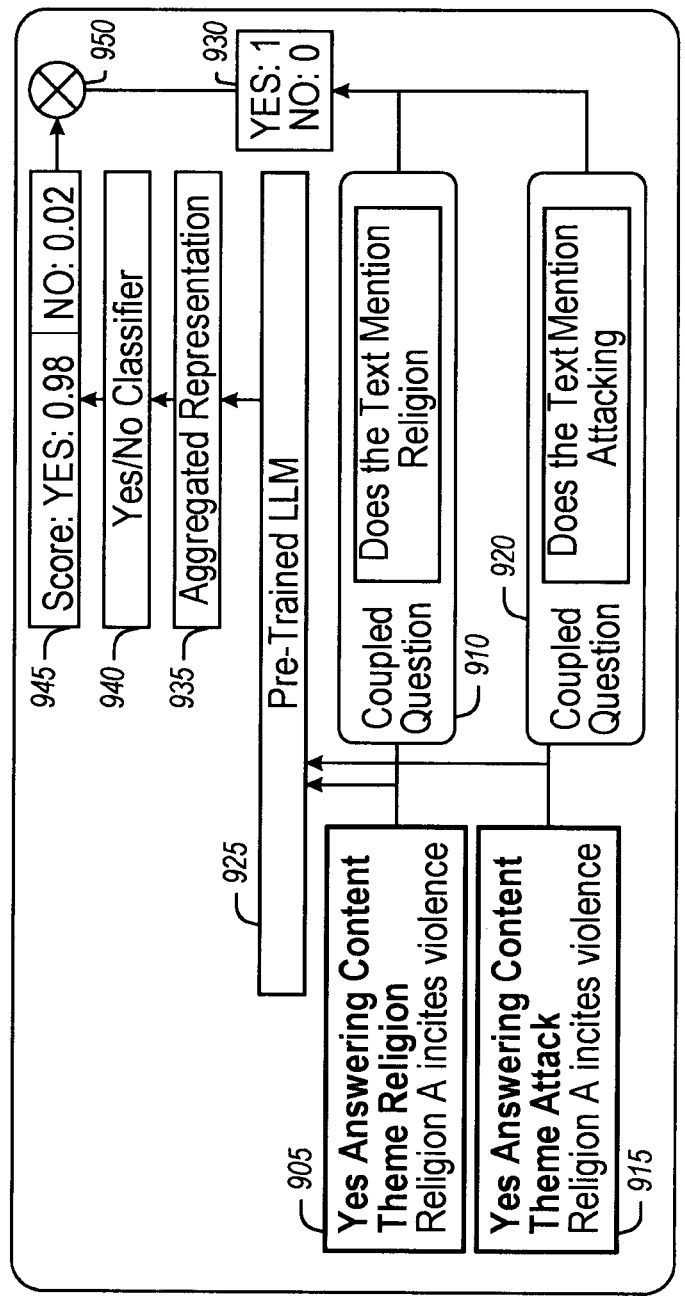
FIG. 9 illustrates an example content classifier training pipeline, according to an embodiment.

FIG. 9 illustrates an example content classifier training pipeline 900, according to an embodiment. The content for training is a concatenation of feed update text and image OCR text. The yes/no Boolean classifier is trained by fine tuning an LLM with a training dataset as depicted in the FIG. 9. In the content classifier training pipeline 900, yes answering content for theme religion 905 is coupled with a question 910 and yes answering content for themes attack 915 is coupled with a question 920. The couples (e.g., religion content 905/question 910 and attack content 915/question 920) are transmitted to a pre-trained LLM 925. The couples have been labeled yes 930. The pre-trained LLM 925 outputs an aggregated representation of the couples 935 into a yes/no classifier 940. The yes/no classifier 940 calculates a score (e.g., a probability, etc.) 945 for the content returning a result for its question as a yes or no. The score 945 is evaluated to assign a result for the content according to policy-based decision logic 950.

Figure 10:
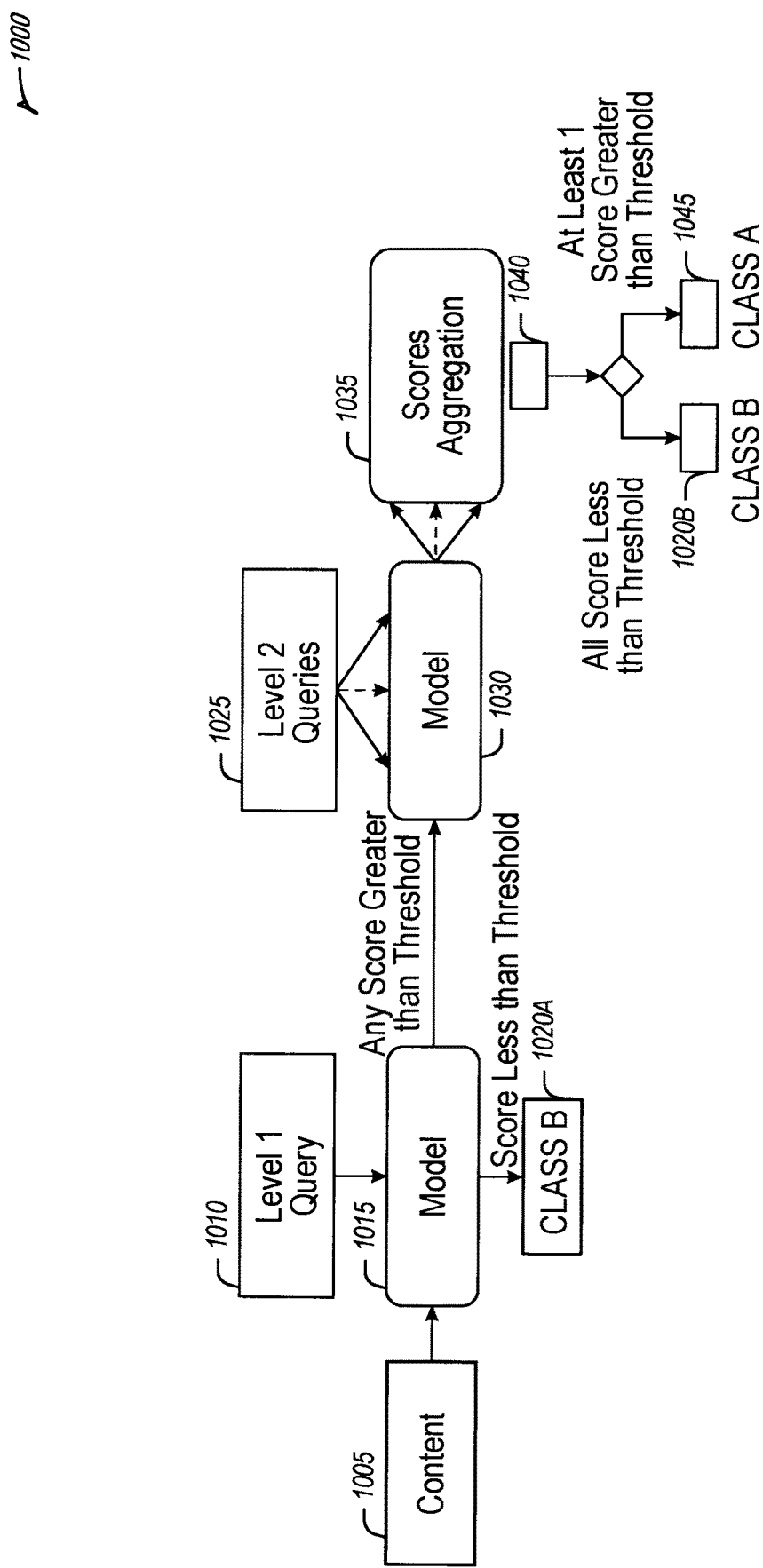
FIG. 10 illustrates an example of a content classifier training inference pipeline, according to an embodiment.

FIG. 10 illustrates an example of a content classifier training inference pipeline 1000, according to an embodiment. A multi-level inference pipeline is utilized that may include the following steps:
1. Concatenate the feed update text and image OCR text together ($D_i$)
2. Issue all j level 1 queries 1010 $\{Q_1^1, Q_2^1, \ldots, Q_j^1\}$ to content 1005 $D_i$.
3. If any of the level 1 queries 1010 from $\{Q_1^1, Q_2^1, \ldots, Q_j^1\}$ returns a score greater than threshold using a model 1015, proceed to the next step. Else mark the content 1005 as Class B (Clear) 1020A and stop inference.
4. Issue all j level 2 queries 1025 $\{Q_1^2, Q_2^2, \ldots, Q_j^2\}$ to content 1005 $D_i$.
5. If any of the level 2 queries 1025 from $\{Q_1^2, Q_2^2, \ldots, Q_j^2\}$ returns a score greater than threshold using a model 1030, a score aggregator 1035, and decision logic 1040, mark the content 1005 as Class A (Hate Speech) 1040, else mark it as Class B (Clear) 1020B.

The imbalance between Class A and Class B contents is represented by n=c+s, where c and s respectively denote a number of Class A and a number of Class B samples while r is an imbalance ratio c=rs and r>1. The reason for this skewness is less availability of yes answering data points which makes the finetuning of LLM difficult. Collecting data itself with the policy sub-themes of the policy poses a challenge. To solve this problem, inflammatory content is used in the training set which contains a level 2 classification (e.g., hateful expression) but does not contain a level 1 classification (e.g., inherent traits). This data will include some 'yes' answering data for level 2 queries.

Sampling hard negative data for training classifier content categories may be a challenging task. To train the model properly, samples are used which include these level 2 classification positive, but level 2 classification negative and vice versa. This provides hard negatives for the training. For example, inflammatory data may be used as one of the hard negative sets for training to classify hate speech.

Currently in the binary classification paradigm, each classifier makes one inference per content to generate a classification result. However, an additional level 1 queries for each content which increases inference time (e.g., ten additional queries may represent a tenfold increase, etc.). If one of the answers for a level 1 queries is yes, level 2 queries need to be issued for the content. This increases the inference overhead by the number of granular queries in a policy. As a solution, one more level of query is added at initiation. The additional query is a policy level query like "Is this content hate speech?" with a very low threshold that acts as a weak classifier at the front to filter out most of the content with only one inference cycle.

Figure 11:
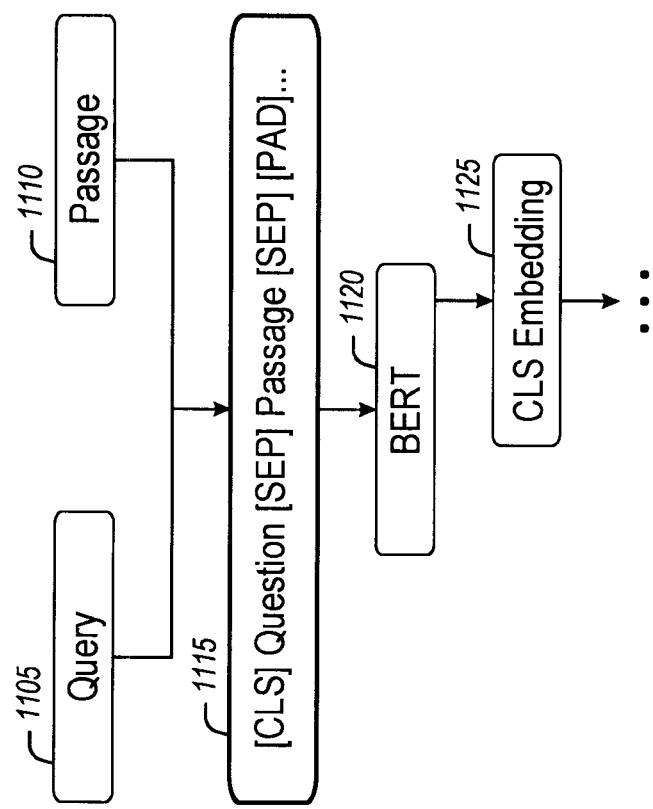
FIG. 11 illustrates and example process for content and query embedding for, according to an embodiment.

FIG. 11 illustrates and example process 1100 for content 1110 and query 1105 embedding for, according to an embodiment. An input query 1105 and content 1110 passage are concatenated 1115 (with [SEP] tokens in between) and passed to a Bidirectional Encoder Representations from Transformers (BERT)-based model 1120. CLS embedding 1125 is then completed for the passage.

In an example, the HUGGINGFACE Trainer API may be used to fine-tune the model. A variety of models may be used as base models to be trained as a classification domain-specific LLM including, but not limited to: bert-large, roberta-large, albert-large-v2, deberta-large, MICROSOFT Turing, etc.

Figure 12:
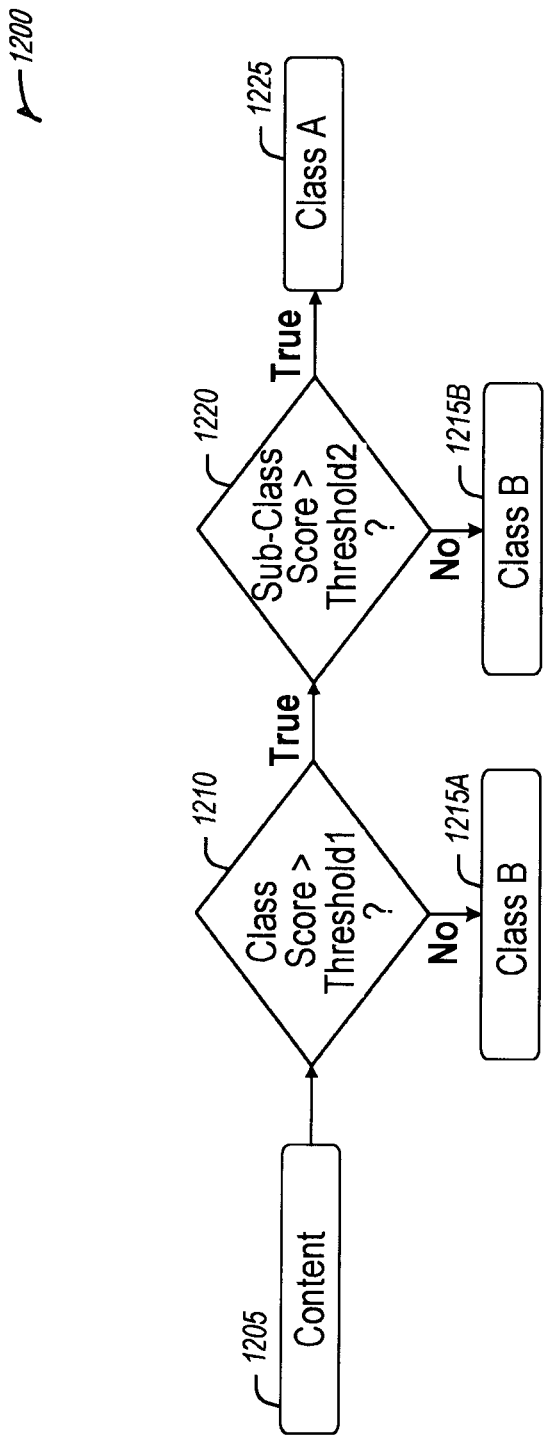
FIG. 12 is a flow diagram of an example to a content classification dataflow, according to an embodiment.

FIG. 12 is a flow diagram of an example to a content classification dataflow 1200, according to an embodiment. A multi-level inference (MLI) approach is used for final Class A 1225 (e.g., hate speech, etc.) or Class B 1215A and 1215B (e.g., non-hate speech, etc.) classification from a binary query-answering model. The a classification query 1210 (e.g., a level 1 query. etc.) and content 1205 is issued to the LLM. If the result to the classification query 1210 is outside a first threshold, the content 1205 is labeled as Class B 1215A (e.g., non-hate-speech, etc.). If the classification query 1210 result is within the first threshold, a sub-classification query 1220 (e.g., a level 2 question, etc.) is issued to the model. If the result to the sub-classification query 1220 is outside a second threshold, the content 1205 is labeled as Class B 1215B (e.g., non-hate-speech, etc.). If the result returned from the classification query 1210 is within the first threshold and the result of the sub-classification query 1220 is within the second threshold, the content 1205 is labeled as Class A 1225 (e.g., hate speech, etc.).

Figure 13:
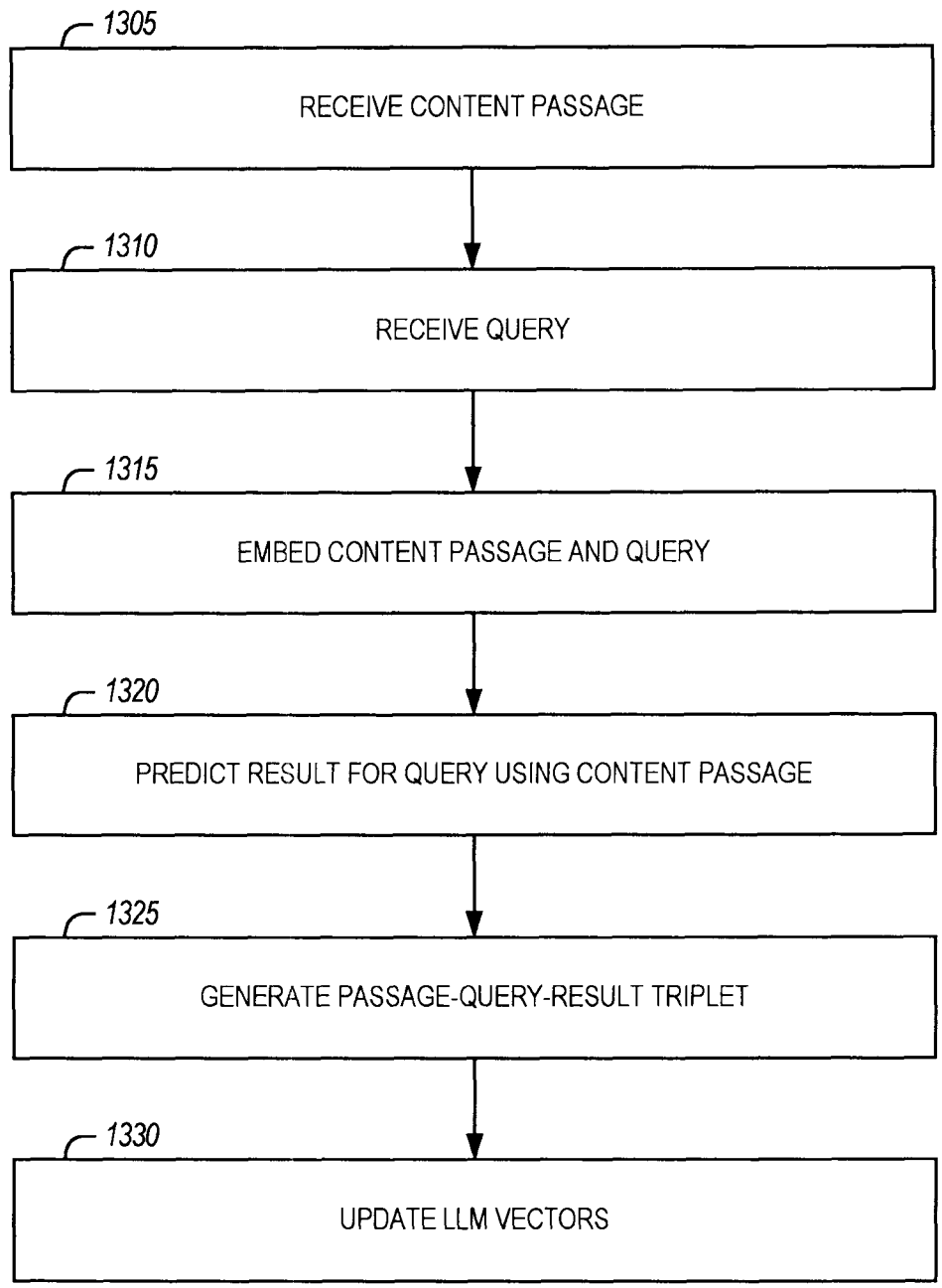
FIG. 13 is a flow chart of an example method for, according to an embodiment.

FIG. 13 is a flow chart of an example method for, according to an embodiment. The method 1300 may provide features as described in FIGS. 1-12.

A content passage is received from a corpus of training data comprising labeled training data and unlabeled training data (e.g., at operation 1305). A query is received from a query hierarchy for a classification domain (e.g., at operation 1310). In an example, the query hierarchy may include a genus query and at least one species query.

The content passage and the query are embedded to form a passage-query pair (e.g., at operation 1315). In an example, query text features may be extracted from the query and the passage-query pair may include the query text features. In an example, content passage text features may be extracted from the content passage and the passage-query pair may include the content passage text features. In an example, the query is concatenated to form a query token and the content passage is concatenated to form a passage token and the passage-query pair includes the query token and the passage token. In an example, text features and optical character recognition (OCR) features may be extracted from the content passage and the text features and the OCR features may be embedded in a text-OCR joint embedding layer. The passage-query pair may include the text-OCR joint embedding layer. In an example, image features may be extracted from the content passage and the image features, the text features, and the OCR features may be embedded in a text-OCR-image joint embedding layer. The passage-query pair may include the text-OCR-image joint embedding layer. In an example, dense layers may be extracted from member features for the content passage and the dense layers, the image features, the text features, and the OCR features may be embedded in a text-OCR-image-member feature joint embedding layer. The passage-query pair may include the text-OCR-image-member feature joint embedding layer.

A predicted result is generated for the passage-query pair based on a calculated probability of the predicted result being within an answer threshold (e.g., at operation 1320). In an example, the predicted result may be generated by evaluating the passage-query pair using Bidirectional Encoder Representations from Transformers (BERT).

A passage-query-result triplet is generated that comprises the passage-query pair and the predicted result according to the query hierarchy for the classification domain (e.g., at operation 1325). Vectors of the content classification large language model are updated using the passage-query-result triplet (e.g., at operation 1330).

In an example, a second content passage may be received and the second content passage may be embedded with a first level query from the query hierarchy. The content classification large language model may infer a first probability of a positive response to the first level query using features of the second content passage. A classification may be output for the second content passage based on the first probability. In an example, it may be determined that the first probability is outside a classification threshold and a first classification may be selected for the second content passage.

In an example, based on a determination that the first probability is within a classification threshold, the second content passage may be embedded with a second level query. The content classification large language model may infer a second probability of a positive response to the second level query using features of the second content passage. A classification may be output for the second content passage based on the second probability. In an example, it may be determined that the second probability is outside a classification threshold and the first classification may be selected for the second content passage. In an example, it may be determined that the second probability is within the classification threshold and a second classification may be selected for the second content passage.

Figure 14:
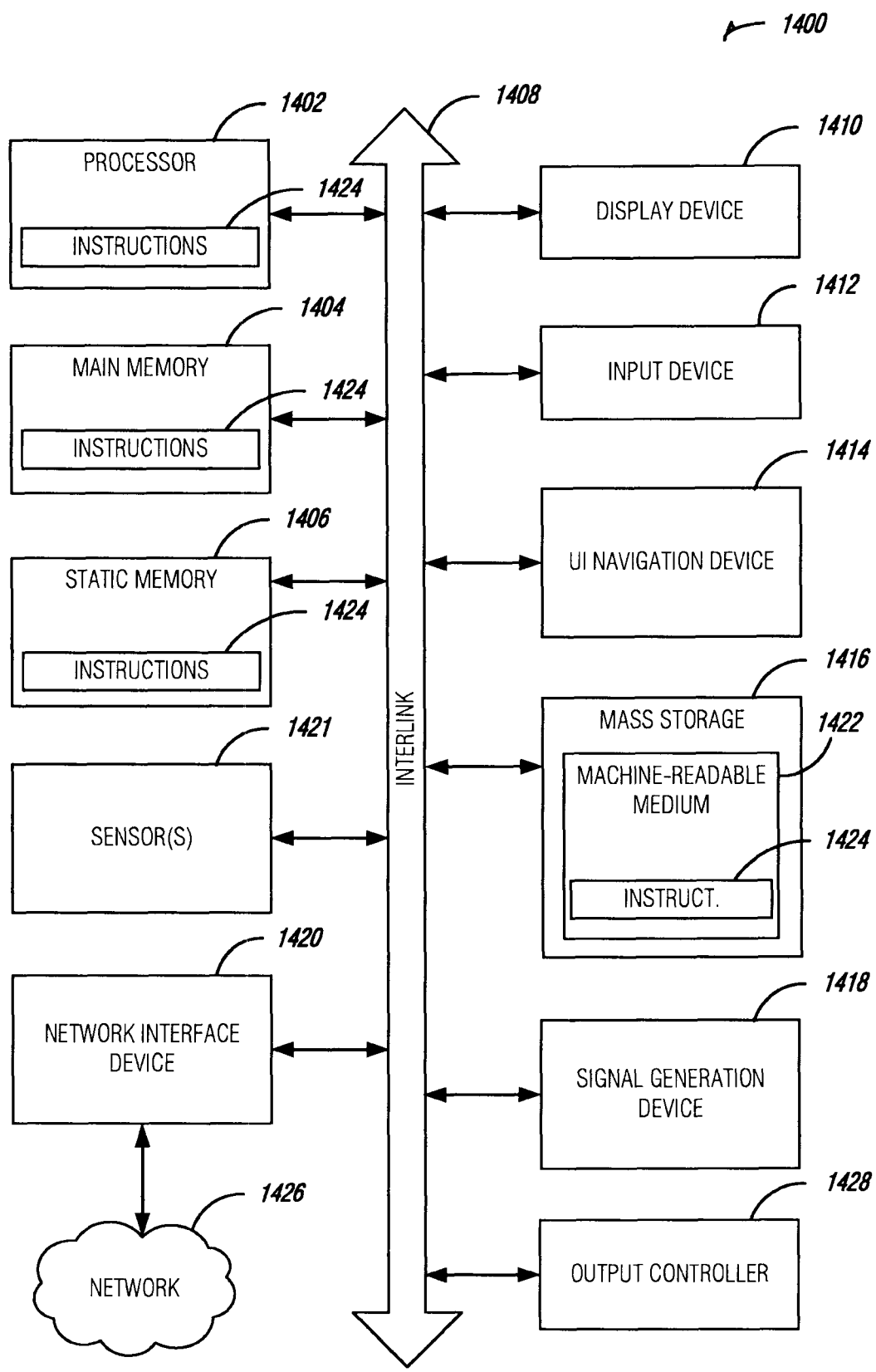
FIG. 14 is a block diagram illustrating an example of a machine upon which one or more embodiments may be implemented.

FIG. 14 illustrates a block diagram of an example machine 1400 upon which any one or more of the techniques (e.g., methodologies) discussed herein may perform. In alternative embodiments, the machine 1400 may operate as a standalone device or may be connected (e.g., networked) to other machines. In a networked deployment, the machine 1400 may operate in the capacity of a server machine, a client machine, or both in server-client network environments. In an example, the machine 1400 may act as a peer machine in peer-to-peer (P2P) (or other distributed) network environment. The machine 1400 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 1400 may include a hardware processor 1402 (e.g., a central processing unit (CPU), a graphics processing unit (GPU), a hardware processor core, or any combination thereof), a main memory 1404 and a static memory 1406, some or all of which may communicate with each other via an interlink (e.g., bus) 1408. The machine 1400 may further include a display unit 1410, an alphanumeric input device 1412 (e.g., a keyboard), and a user interface (UI) navigation device 1414 (e.g., a mouse). In an example, the display unit 1410, input device 1412 and UI navigation device 1414 may be a touch screen display. The machine 1400 may additionally include a storage device (e.g., drive unit) 1416, a signal generation device 1418 (e.g., a speaker), a network interface device 1420, and one or more sensors 1421, such as a global positioning system (GPS) sensor, compass, accelerometer, or other sensors. The machine 1400 may include an output controller 1428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1416 may include a machine readable medium 1422 on which is stored one or more sets of data structures or instructions 1424 (e.g., software) embodying or utilized by any one or more of the techniques or functions described herein. The instructions 1424 may also reside, completely or at least partially, within the main memory 1404, within static memory 1406, or within the hardware processor 1402 during execution thereof by the machine 1400. In an example, one or any combination of the hardware processor 1402, the main memory 1404, the static memory 1406, or the storage device 1416 may constitute machine readable media.

While the machine readable medium 1422 is illustrated as a single medium, the term "machine readable medium" may include a single medium or multiple media (e.g., a centralized or distributed database, and/or associated caches and servers) configured to store the one or more instructions 1424.

The term "machine readable medium" may include any medium that is capable of storing, encoding, or carrying instructions for execution by the machine 1400 and that cause the machine 1400 to perform any one or more of the techniques of the present disclosure, or that is capable of storing, encoding or carrying data structures used by or associated with such instructions. Non-limiting machine readable medium examples may include solid-state memories, and optical and magnetic media. In an example, machine readable media may exclude transitory propagating signals (e.g., non-transitory machine-readable storage media). Specific examples of non-transitory machine-readable storage media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1424 may further be transmitted or received over a communications network 1426 using a transmission medium via the network interface device 1420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, LoRa®/LoRaWAN® LPWAN standards, etc.), IEEE 802.15.4 family of standards, peer-to-peer (P2P) networks, $3^{rd}$ Generation Partnership Project (3GPP) standards for 4G and 5G wireless communication including: 3GPP Long-Term evolution (LTE) family of standards, 3GPP LTE Advanced family of standards, 3GPP LTE Advanced Pro family of standards, 3GPP New Radio (NR) family of standards, among others. In an example, the network interface device 1420 may include one or more physical jacks (e.g., Ethernet, coaxial, or phone jacks) or one or more antennas to connect to the communications network 1426. In an example, the network interface device 1420 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1400, and includes digital or analog communications signals or other intangible medium to facilitate communication of such software.

ADDITIONAL NOTES & EXAMPLES

Example 1 is a system for training a content classification large language model comprising: at least one processor; and memory comprising instructions that, when executed by the at least one processor, cause the at least one processor to perform operations to: receive a content passage from a corpus of training data; receive a query from a query hierarchy for a classification domain; embed the content passage and the query to form a passage-query pair; generate a predicted result for the passage-query pair based on a calculated probability of the predicted result being within an answer threshold; generate a passage-query-result triplet comprising the passage-query pair and the predicted result according to the query hierarchy for the classification domain; and update vectors of the content classification large language model using the passage-query-result triplet.

In Example 2, the subject matter of Example 1 includes, the memory further comprising instructions that, when executed by the at least one processor, cause the at least one processor to perform operations to: concatenate the query to form a query token; and concatenate the content passage to form a passage token, wherein the passage-query pair includes the query token and the passage token, and wherein the predicted result is generated by evaluating the passage-query pair using Bidirectional Encoder Representations from Transformers (BERT).

In Example 3, the subject matter of Examples 1-2 includes, the instructions to embed the content passage and the query to form a passage-query pair further comprising instructions to: extract text features and optical character recognition (OCR) features from the content passage; and embed the text features and the OCR features in a text-OCR joint embedding layer, wherein the passage-query pair includes the text-OCR joint embedding layer.

In Example 4, the subject matter of Example 3 includes, the instructions to embed the content passage and the query to form a passage-query pair further comprising instructions to: extract image features from the content passage; and embed the image features, the text features, and the OCR features in a text-OCR-image joint embedding layer, wherein the passage-query pair includes the text-OCR-image joint embedding layer.

In Example 5, the subject matter of Example 4 includes, the instructions to embed the content passage and the query to form a passage-query pair further comprising instructions to: extract dense layers from member feature for the content passage; and embed the dense layers, the image features, the text features, and the OCR features in a text-OCR-image-member feature joint embedding layer, wherein the passage-query pair includes the text-OCR-image-member feature joint embedding layer.

In Example 6, the subject matter of Examples 1-5 includes, the memory further comprising instructions that, when executed by the at least one processor, cause the at least one processor to perform operations to extract query text features from the query, wherein the passage-query pair includes the query text features.

In Example 7, the subject matter of Examples 1-6 wherein the query hierarchy includes a genus query and at least one species query.

In Example 8, the subject matter of Examples 1-7 includes, the memory further comprising instructions that, when executed by the at least one processor, cause the at least one processor to perform operations to: receive a second content passage; embed the second content passage with a first level query from the query hierarchy; infer, by the content classification large language model, a first probability of a positive response to the first level query using features of the second content passage; and output a classification for the second content passage based on the first probability.

In Example 9, the subject matter of Example 8 includes, the memory further comprising instructions that, when executed by the at least one processor, cause the at least one processor to perform operations to: determine that the first probability is outside a classification threshold; and select a first classification for the second content passage.

In Example 10, the subject matter of Examples 8-9 includes, the memory further comprising instructions that, when executed by the at least one processor, cause the at least one processor to perform operations to: based on a determination that the first probability is within a classification threshold, embed the second content passage with a second level query; infer, by the content classification large language model, a second probability of a positive response to the second level query using features of the second content passage; and output a classification for the second content passage based on the second probability.

In Example 11, the subject matter of Example 10 includes, the memory further comprising instructions that, when executed by the at least one processor, cause the at least one processor to perform operations to: determine that the second probability is outside a classification threshold; and select a first classification for the second content passage.

In Example 12, the subject matter of Examples 10-11 includes, the memory further comprising instructions that, when executed by the at least one processor, cause the at least one processor to perform operations to: determine that the second probability is within a classification threshold; and select a second classification for the second content passage.

Example 13 is at least one non-transitory machine-readable medium comprising instructions for training a content classification large language model that, when executed by at least one processor, cause the at least one processor to perform operations to: receive a content passage from a corpus of training data; receive a query from a query hierarchy for a classification domain; embed the content passage and the query to form a passage-query pair; generate a predicted result for the passage-query pair based on a calculated probability of the predicted result being within an answer threshold; generate a passage-query-result triplet comprising the passage-query pair and the predicted result according to the query hierarchy for the classification domain; and update vectors of the content classification large language model using the passage-query-result triplet.

In Example 14, the subject matter of Example 13 includes, instructions that, when executed by the at least one processor, cause the at least one processor to perform operations to: concatenate the query to form a query token; and concatenate the content passage to form a passage token, wherein the passage-query pair includes the query token and the passage token, and wherein the predicted result is generated by evaluating the passage-query pair using Bidirectional Encoder Representations from Transformers (BERT).

In Example 15, the subject matter of Examples 13-14 includes, the instructions to embed the content passage and the query to form a passage-query pair further comprising instructions to: extract text features and optical character recognition (OCR) features from the content passage; and embed the text features and the OCR features in a text-OCR joint embedding layer, wherein the passage-query pair includes the text-OCR joint embedding layer.

In Example 16, the subject matter of Example 15 includes, the instructions to embed the content passage and the query to form a passage-query pair further comprising instructions to: extract image features from the content passage; and embed the image features, the text features, and the OCR features in a text-OCR-image joint embedding layer, wherein the passage-query pair includes the text-OCR-image joint embedding layer.

In Example 17, the subject matter of Example 16 includes, the instructions to embed the content passage and the query to form a passage-query pair further comprising instructions to: extract dense layers from member feature for the content passage; and embed the dense layers, the image features, the text features, and the OCR features in a text-OCR-image-member feature joint embedding layer, wherein the passage-query pair includes the text-OCR-image-member feature joint embedding layer.

In Example 18, the subject matter of Examples 13-17 includes, instructions that, when executed by the at least one processor, cause the at least one processor to perform operations to extract query text features from the query, wherein the passage-query pair includes the query text features.

In Example 19, the subject matter of Examples 13-18 wherein the query hierarchy includes a genus query and at least one species query.

In Example 20, the subject matter of Examples 13-19 includes, instructions that, when executed by the at least one processor, cause the at least one processor to perform operations to: receive a second content passage; embed the second content passage with a first level query from the query hierarchy; infer, by the content classification large language model, a first probability of a positive response to the first level query using features of the second content passage; and output a classification for the second content passage based on the first probability.

In Example 21, the subject matter of Example 20 includes, instructions that, when executed by the at least one processor, cause the at least one processor to perform operations to: determine that the first probability is outside a classification threshold; and select a first classification for the second content passage.

In Example 22, the subject matter of Examples 20-21 includes, instructions that, when executed by the at least one processor, cause the at least one processor to perform operations to: based on a determination that the first probability is within a classification threshold, embed the second content passage with a second level query; infer, by the content classification large language model, a second probability of a positive response to the second level query using features of the second content passage; and output a classification for the second content passage based on the second probability.

In Example 23, the subject matter of Example 22 includes, instructions that, when executed by the at least one processor, cause the at least one processor to perform operations to: determine that the second probability is outside a classification threshold; and select a first classification for the second content passage.

In Example 24, the subject matter of Examples 22-23 includes, instructions that, when executed by the at least one processor, cause the at least one processor to perform operations to: determine that the second probability is within a classification threshold; and select a second classification for the second content passage.

Example 25 is a method for training a content classification large language model comprising: receiving a content passage from a corpus of training data; receiving a query from a query hierarchy for a classification domain; embedding the content passage and the query to form a passage-query pair; generating a predicted result for the passage-query pair based on a calculated probability of the predicted result being within an answer threshold; generating a passage-query-result triplet comprising the passage-query pair and the predicted result according to the query hierarchy for the classification domain; and updating vectors of the content classification large language model using the passage-query-result triplet.

In Example 26, the subject matter of Example 25 includes, concatenating the query to form a query token; and concatenating the content passage to form a passage token, wherein the passage-query pair includes the query token and the passage token, and wherein the predicted result is generated by evaluating the passage-query pair using Bidirectional Encoder Representations from Transformers (BERT).

In Example 27, the subject matter of Examples 25-26 wherein embedding the content passage and the query to form a passage-query pair further comprises: extracting text features and optical character recognition (OCR) features from the content passage; and embedding the text features and the OCR features in a text-OCR joint embedding layer, wherein the passage-query pair includes the text-OCR joint embedding layer.

In Example 28, the subject matter of Example 27 wherein embedding the content passage and the query to form a passage-query pair further comprises: extracting image features from the content passage; and embedding the image features, the text features, and the OCR features in a text-OCR-image joint embedding layer, wherein the passage-query pair includes the text-OCR-image joint embedding layer.

In Example 29, the subject matter of Example 28 wherein embedding the content passage and the query to form a passage-query pair further comprises: extracting dense layers from member feature for the content passage; and embedding the dense layers, the image features, the text features, and the OCR features in a text-OCR-image-member feature joint embedding layer, wherein the passage-query pair includes the text-OCR-image-member feature joint embedding layer.

In Example 30, the subject matter of Examples 25-29 includes, extracting query text features from the query, wherein the passage-query pair includes the query text features.

In Example 31, the subject matter of Examples 25-30 wherein the query hierarchy includes a genus query and at least one species query.

In Example 32, the subject matter of Examples 25-31 includes, receiving a second content passage; embedding the second content passage with a first level query from the query hierarchy; inferring, by the content classification large language model, a first probability of a positive response to the first level query using features of the second content passage; and outputting a classification for the second content passage based on the first probability.

In Example 33, the subject matter of Example 32 includes, determining that the first probability is outside a classification threshold; and selecting a first classification for the second content passage.

In Example 34, the subject matter of Examples 32-33 includes, based on determining that the first probability is within a classification threshold, embedding the second content passage with a second level query; inferring, by the content classification large language model, a second probability of a positive response to the second level query using features of the second content passage; and outputting a classification for the second content passage based on the second probability.

In Example 35, the subject matter of Example 34 includes, determining that the second probability is outside a classification threshold; and selecting a first classification for the second content passage.

In Example 36, the subject matter of Examples 34-35 includes, determining that the second probability is within a classification threshold; and selecting a second classification for the second content passage.

Example 37 is at least one machine-readable medium including instructions that, when executed by a machine, cause the machine to perform any method of Examples 25-36.

Example 38 is a system comprising means to perform any method of Examples 25-36.

Example 39 is at least one machine-readable medium including instructions that, when executed by processing circuitry, cause the processing circuitry to perform operations to implement of any of Examples 1-38.

Example 40 is an apparatus comprising means to implement of any of Examples 1-38.

Example 41 is a system to implement of any of Examples 1-38.

Example 42 is a method to implement of any of Examples 1-38.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for training a content classification large language model comprising:
    at least one processor; and
    memory comprising instructions that, when executed by the at least one processor, cause the at least one processor to perform operations to:
        receive a content passage from a corpus of training data;
        receive a query from a query hierarchy for a classification domain;
        embed the content passage and the query to form a passage-query pair;
        generate a predicted result for the passage-query pair based on a calculated probability of the predicted result being within an answer threshold;
        generate a passage-query-result triplet comprising the passage-query pair and the predicted result according to the query hierarchy for the classification domain; and
        update vectors of the content classification large language model using the passage-query-result triplet.

2. The system of claim 1, the memory further comprising instructions that, when executed by the at least one processor, cause the at least one processor to perform operations to:
    concatenate the query to form a query token; and
    concatenate the content passage to form a passage token, wherein the passage-query pair includes the query token and the passage token, and wherein the predicted result is generated by evaluating the passage-query pair using Bidirectional Encoder Representations from Transformers (BERT).

3. The system of claim 1, the instructions to embed the content passage and the query to form a passage-query pair further comprising instructions to:

extract text features and optical character recognition (OCR) features from the content passage; and embed the text features and the OCR features in a text-OCR joint embedding layer, wherein the passage-query pair includes the text-OCR joint embedding layer.

4. The system of claim 3, the instructions to embed the content passage and the query to form a passage-query pair further comprising instructions to:

extract image features from the content passage; and embed the image features, the text features, and the OCR features in a text-OCR-image joint embedding layer, wherein the passage-query pair includes the text-OCR-image joint embedding layer.

5. The system of claim 4, the instructions to embed the content passage and the query to form a passage-query pair further comprising instructions to:

extract dense layers from member feature for the content passage; and embed the dense layers, the image features, the text features, and the OCR features in a text-OCR-image-member feature joint embedding layer, wherein the passage-query pair includes the text-OCR-image-member feature joint embedding layer.

6. The system of claim 1, the memory further comprising instructions that, when executed by the at least one processor, cause the at least one processor to perform operations to extract query text features from the query, wherein the passage-query pair includes the query text features.

7. The system of claim 1, wherein the query hierarchy includes a genus query and at least one species query.

8. The system of claim 1, the memory further comprising instructions that, when executed by the at least one processor, cause the at least one processor to perform operations to:

receive a second content passage;

embed the second content passage with a first level query from the query hierarchy;

infer, by the content classification large language model, a first probability of a positive response to the first level query using features of the second content passage; and output a classification for the second content passage based on the first probability.

9. The system of claim 8, the memory further comprising instructions that, when executed by the at least one processor, cause the at least one processor to perform operations to:

determine that the first probability is outside a classification threshold; and select a first classification for the second content passage.

10. The system of claim 8, the memory further comprising instructions that, when executed by the at least one processor, cause the at least one processor to perform operations to:

based on a determination that the first probability is within a classification threshold, embed the second content passage with a second level query;

infer, by the content classification large language model, a second probability of a positive response to the second level query using features of the second content passage; and output a classification for the second content passage based on the second probability.

11. The system of claim 10, the memory further comprising instructions that, when executed by the at least one processor, cause the at least one processor to perform operations to:

determine that the second probability is outside a classification threshold; and select a first classification for the second content passage.

12. The system of claim 10, the memory further comprising instructions that, when executed by the at least one processor, cause the at least one processor to perform operations to:

determine that the second probability is within a classification threshold; and select a second classification for the second content passage.

13. A method for training a content classification large language model comprising:

receiving a content passage from a corpus of training data;

receiving a query from a query hierarchy for a classification domain;

embedding the content passage and the query to form a passage-query pair;

generating a predicted result for the passage-query pair based on a calculated probability of the predicted result being within an answer threshold;

generating a passage-query-result triplet comprising the passage-query pair and the predicted result according to the query hierarchy for the classification domain; and updating vectors of the content classification large language model using the passage-query-result triplet.

14. The method of claim 13, further comprising:

concatenating the query to form a query token; and concatenating the content passage to form a passage token, wherein the passage-query pair includes the query token and the passage token, and wherein the predicted result is generated by evaluating the passage-query pair using Bidirectional Encoder Representations from Transformers (BERT).

15. The method of claim 13, wherein embedding the content passage and the query to form a passage-query pair further comprises:

extracting text features and optical character recognition (OCR) features from the content passage; and embedding the text features and the OCR features in a text-OCR joint embedding layer, wherein the passage-query pair includes the text-OCR joint embedding layer.

16. The method of claim 15, wherein embedding the content passage and the query to form a passage-query pair further comprises:

extracting image features from the content passage; and embedding the image features, the text features, and the OCR features in a text-OCR-image joint embedding layer, wherein the passage-query pair includes the text-OCR-image joint embedding layer.

17. The method of claim 16, wherein embedding the content passage and the query to form a passage-query pair further comprises:

extracting dense layers from member feature for the content passage; and embedding the dense layers, the image features, the text features, and the OCR features in a text-OCR-image-member feature joint embedding layer, wherein the passage-query pair includes the text-OCR-image-member feature joint embedding layer.

18. The method of claim 13, further comprising extracting query text features from the query, wherein the passage-query pair includes the query text features.

19. At least one non-transitory machine-readable medium comprising instructions for training a content classification large language model that, when executed by at least one processor, cause the at least one processor to perform operations to:

receive a content passage from a corpus of training data;
receive a query from a query hierarchy for a classification domain;
embed the content passage and the query to form a passage-query pair;
generate a predicted result for the passage-query pair based on a calculated probability of the predicted result being within an answer threshold;
generate a passage-query-result triplet comprising the passage-query pair and the predicted result according to the query hierarchy for the classification domain; and
update vectors of the content classification large language model using the passage-query-result triplet.

20. The at least one non-transitory machine-readable medium of claim 19, further comprising instructions that, when executed by the at least one processor, cause the at least one processor to perform operations to:
receive a second content passage;
embed the second content passage with a first level query from the query hierarchy;
infer, by the content classification large language model, a first probability of a positive response to the first level query using features of the second content passage; and
output a classification for the second content passage based on the first probability.

* * * * *